July 17, 1956 W. M. POHL 2,754,948
TORQUE TRANSMITTING COUPLING
Filed March 2, 1953

INVENTOR.
Walter M. Pohl,
BY
Bair, Freeman & Molinare
ATTORNEYS.

United States Patent Office 2,754,948
Patented July 17, 1956

2,754,948

TORQUE TRANSMITTING COUPLING

Walter M. Pohl, Chicago, Ill., assignor to Foote Bros. Gear & Machine Corporation, Chicago, Ill., a corporation of Delaware Application March 2, 1953, Serial No. 339,877

14 Claims. (Cl. 192—105)

This invention relates to torque transmitting couplings and more particularly to couplings of the centrifugally responsive friction band type.

Torque transmitting couplings of the type in which a friction band is driven through a connection from its leading end to a hub, and which engages a drum in response to centrifugal force, are well known. Such couplings have a very great advantage in the fact that the torque transmitted is substantially independent of variations in the coefficient of friction between the band and the drum.

As heretofore constructed, couplings of this type have been relatively complex and have been difficult to balance due to the fact that two axially spaced bands are employed, with their ends connected to the hub at diametrically and axially spaced points. The parts have been difficult to assemble and have not been constructed so that the friction bands and the hub can easily be disassembled as a unit from the drum, which is desirable in many types of uses. Furthermore, such couplings are subject to a relatively high degree of friction drag in their disengaged position, as for example, when the hub is stationary and the drum is rotating.

It is accordingly, one of the objects of the present invention to provide a torque transmitting coupling of the friction band type which is extremely simple and inexpensive in construction, is easy to assemble and disassemble, is inherently balanced, both statically and dynamically, and has a minimum friction drag in its disengaged position.

Another object is to provide a coupling in which the hub and bands form a unitary sub-assembly, which is entirely self-contained and which can be run without damage when not assembled in the drum.

A further object is to provide a coupling which is capable of absorbing torque impulses and of operating under conditions of mis-alignment between the hub and the drum.

The above and other objects and advantages of the invention will be more readily apparent from the following description, when read with the accompanying drawing, in which—

The coupling, as shown, comprises a driving hub 10, formed to be mounted on a driving shaft such as the shaft of an electric motor or an internal combustion engine. The driven element is in the form of a cylindrical drum 11 mounted concentric with the hub 10 and spaced therefrom. The drum 11 is carried by a flange 12, connected to a hub 13 which may be connected to a shaft to be driven.

Figure 1:
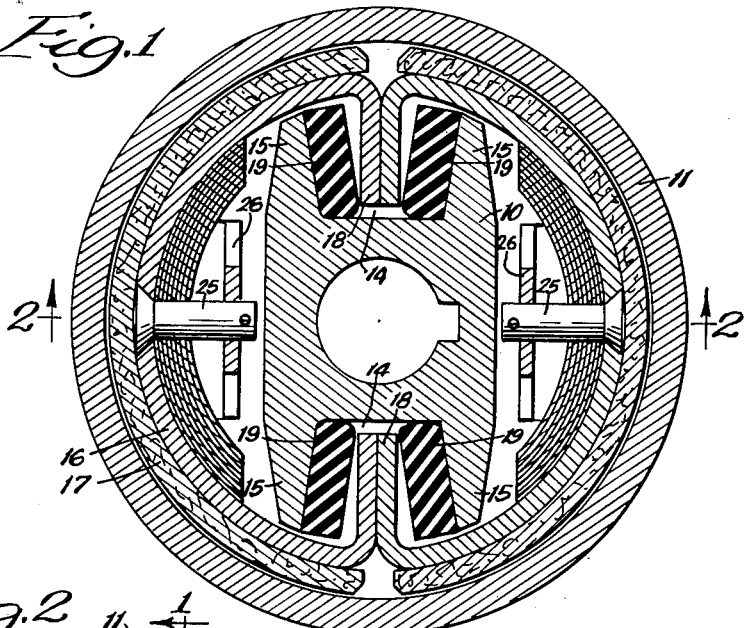
Figure 1 is a section through a coupling embodying the invention taken on the line 1—1 of Figure 2.
Figure 2:
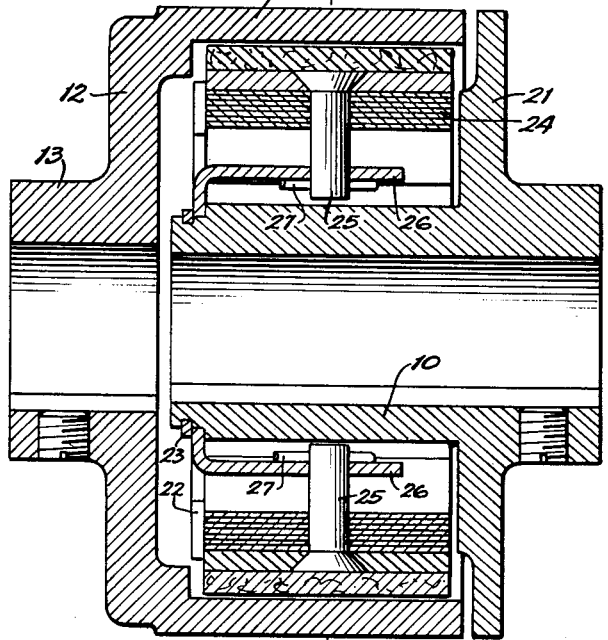
Figure 2 is an axial section through the coupling on the line 2—2 of Figure 1.
Figure 3:
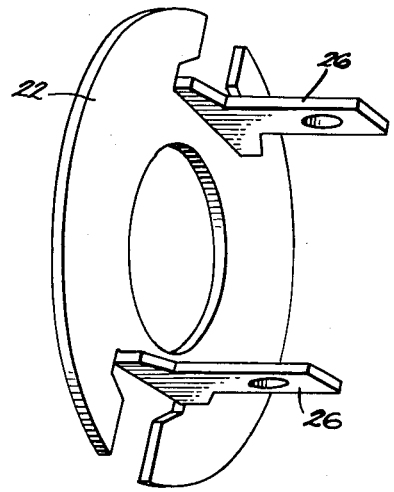
Figure 3 is a perspective view of the closure plate and spring unit.

The hub 10, as best seen in Figure 1, is formed at diametrically opposite points with relatively wide notches 14, each defined by outwardly projecting driving lugs 15, spaced circumferentially apart. Between the driving notches the hub is preferably reduced, as shown in Figure 1, to provide space for the spring and weight mechanisms, to be described hereinafter.

The driving lugs 15 terminate in spaced relationship to the drum 11 and all have their outer ends lined at an equal distance from the axis of the hub.

The hub is adapted to support and drive friction bands, shown as formed of metal strips 16, bent to arcuate shape, and carrying friction lining 17 to engage the inner surface of the drum. Each of the friction bands extends through substantially a half of a circle, and has it ends turned inward, as indicated at 18, to fit into the driving notches. It will be noted that the driving notches are substantially wider than the combined thickness of the inwardly turned ends 18, to receive between the inwardly turned ends and the driving lugs, resilient pads 19, formed of rubber or similar resilient material.

To hold the friction bands properly located on the hub an integral flange 21 is formed on the hub, to fit over and substantially to close the open end of the drum 11. The flange 21 will engage one edge of the friction bands to hold them against axial displacement in one direction. At the opposite end of the hub an annular plate 22 is secured thereto, as by means of a snap ring 23. The plate 22 engages the opposite edges of the friction bands and holds them in proper axial position on the hub in the same plane.

To provide additional weight for urging the friction bands outward in response to centrifugal force, strip weights 24 may be secured thereto, as more particularly described and claimed in my copending application Serial No. 314,032, filed October 10, 1952, now abandoned. The strip weights may be held in place by studs or rivets 25, secured to the central portions of the bands 16 and extending radially inward therefrom.

For many types of installations it is desirable to provide spring force in addition to that furnished by the resilient pads 19, to urge the friction bands inward, thereby to control the speed at which the coupling will engage. For this purpose, spring fingers 26 may be cut out of the plate 22 and bent to extend axially therefrom, as shown. Each of the spring fingers may be formed with an opening at its inner free end, through which one of the rivets 25 may extend. A fastening, such as a cotter pin 27 may be passed through the rivets 25 at the inner side of the spring fingers 26 so that the spring fingers will draw the friction bands inward.

It will be seen that the coupling of the present invention can be manufactured and assembled very simply. For assembly it is necessary only to slip the friction bands axially onto the hub with their inwardly turned ends 18 fitting into the driving notches. The resilient pads 19 may be secured in place or may simply be fitted loosely into the notches as desired. Thereafter, the plate 22 may be mounted on the hub and secured by the snap ring 23. When the spring fingers 26 are employed, the friction bands may conveniently be assembled to the plate and the entire assembly fitted onto the hub.

With the friction bands assembled on the hub, it will be seen that a complete unitary sub-assembly is provided, which can be operated apart from the drum without damage. As the hub turns, the friction bands tend to move outward in response to centrifugal force, but their degree of outward movement is limited by engagement of the driving projections 18 with the driving lugs 15. Therefore, the hub and band sub-assembly can be run apart from the drum, which is highly desirable in many kinds of installations, as for example, those employing an internal combustion engine as the driving motor.

When the hub and band assembly is assembled in a drum, which can be accomplished simply by slipping it axially into the open end of the drum, the unit is ready for operation. As the hub turns, diametrically opposite driving lugs 15 will engage the adjacent driving projections 18 on the bands, to turn the bands with the hub. It will be seen that, regardless of the direction of hub rotation, each of the bands is always driven by a connection from its leading edge to the hub, so that the desirable characteristics of a coupling of this type are retained. Also, since the bands are identical, manufacture is simplified and the unit is inherently balanced both statically and dynamically. The resilient blocks 19 will function not only to absorb torque impulses, but will also enable the bands to align accurately with the drum, even though there is misalignment between the hub and the drum. In installations where these factors are unimportant, the resilient pads may be omitted and the notches 14 correspondingly narrowed to limit radial movement of the bands to the desired maximum amount.

According to one important feature of the invention, when the hub is stationary or is turning at very low speed, the friction bands will be drawn radially inward, either by the resilient pads 19 or by the springs 26 or both, so that their inner surfaces engage the outer ends of the driving lugs 15. Since the driving lugs are symmetrically spaced about the hub axis, and since the friction bands are arcuate, the lugs will support the friction bands in accurately centered relationship on the hub, so that clearance between the bands and the drum will be provided throughout the full length of the bands. This feature eliminates friction drag between the hub and the drum, even though the drum may be rotating while the hub is stationary or turning at low speed.

Figure 4:
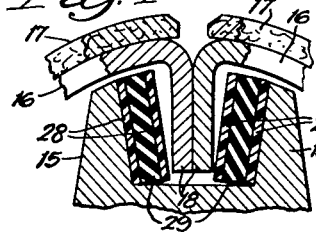
Figures 4 and 5 are partial sections similar to Figure 1 of slightly modified constructions.

In cases where cushioning of torque impulses and accommodation of misalignment are desired but greater wear is required than that which solid rubber blocks 19 can furnish, a construction as shown in Figure 4 may be employed. In this construction, in which most of the parts are identical with the parts in Figure 1 and are indicated by the same reference numerals, the solid blocks 19 are replaced by composite blocks having outer wear plates 28 resiliently connected by elastic material 29. The plates 28 may be formed of a hard plastic having good wearing properties such as nylon or plastic impregnated fabric while the elastic material 29 may be rubber, synthetic rubber, or an elastic plastic bonded or cemented to the wear plates.

Figure 5:
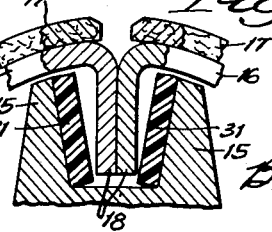

For many types of service a relatively hard block formed of a solid plastic material as shown at 31 in Figure 5 may be employed. This block when formed of a material such as nylon, relatively hard resin or impregnated fabric will wear extremely well, will provide a quiet operating unit and will yield sufficiently to permit a slight degree of misalignment.

While one embodiment of the invention has been shown and described in detail, it will be understood that this is for the purpose of illustration only, and is not to be taken as a definition of the scope of the invention, reference being had for this purpose, to the appended claims.

What is claimed is:

1. In a torque transmitting coupling, a rotatable driving hub, a pair of circumferentially spaced driving lugs extending radially outward from the hub with their outer ends equally spaced from the hub axis, an arcuately curved friction band fitting around the hub with its end portions radially overlying and normally supported on the ends of the driving lugs to be held centered with respect to the hub by the driving lugs, and inwardly extending driving projections on the ends of the band extending inward over the driving lugs and having clearance therewith to drive the band with the hub and to limit radial outward movement of the band relative to the hub.

2. In a torque transmitting coupling, a rotatable driving hub, a pair of circumferentially spaced driving lugs extending outward from the hub with their outer ends equally spaced from the hub axis, an arcuately curved friction band fitting around the hub with its end portions radially overlying and normally supported on the ends of the driving lugs to be held centered with respect to the hub by the driving lugs, and inwardly extending driving projections on the ends of the band extending inward over the driving lugs and having clearance therewith to drive the band with the hub and to limit radial outward movement of the band relative to the hub and spring means carried by the hub and connected to the band to urge the band inward toward the driving lugs.

3. In a torque transmitting coupling, a rotatable driving hub, a pair of circumferentially spaced driving lugs extending radially outward from the hub with their outer ends equally spaced from the hub axis, an arcuately curved friction band fitting around the hub with its end portions radially overlying and normally supported on the ends of the driving lugs to be held centered with respect to the hub by the driving lugs, and inwardly extending driving projections on the ends of the band extending inward over the driving lugs and having clearance therewith to drive the band with the hub and to limit radial outward movement of the band relative to the hub and resilient pads between the driving projections and the driving lugs.

4. In a torque transmitting coupling, a rotatable driving hub having a plurality of circumferentially spaced peripheral notches each defined by substantially radially extending spaced lugs, a plurality of arcuate friction bands lying in radial registry around the hub corresponding in number to the notches and extending between the notches, the end portions of each band overlying lugs for two different notches and inwardly extending driving projections on the ends of the bands extending into the notches respectively and having clearance with the sides thereof to drive the bands with the hub and to limit radial outward movement of the bands on the hub, and resilient pads between the driivng projections and the sides of the notches.

5. In a torque transmitting coupling, a rotatable driving hub having a plurality of circumferentially spaced peripheral notches each defined by substantially radially extending spaced lugs, a plurality of arcuate friction bands lying in radial registry around the hub corresponding in number to the notches and extending between the notches, the end portions of each band overlying lugs for two different notches and inwardly extending driving projections on the ends of the bands extending into the notches respectively and having clearance with the sides thereof to drive the bands with the hub and to limit radial outward movement of the bands on the hub, a plate secured to the hub at one side of the bands to limit axial movement of the bands on the hub and spring fingers extending axially from the plate and connected to the bands to urge the bands inward on the hub.

6. In a torque transmitting coupling, a rotatable driving hub having a pair of diametrically opposite notches each defined by a pair of spaced outwardly extending lugs, a pair of arcuate friction bands fiitting around the hub in radial registry and each extending through substantially a semi-circle, and driving projections extending radially inward from the ends of the bands and fitting loosely in the driving notches.

7. In a torque transmitting coupling, a rotatable driving hub having a pair of diametrically opposite notches each defined by a pair of spaced outwardly extending lugs, a pair of arcuate friction bands fitting around the hub in radial registry and each extending through substantially a semi-circle, and driving projections extending radially inward from the ends of the bands and fitting loosely in the driving notches, the lugs being of equal radial length to engage the bands and hold them centered on the hub.

8. In a torque transmitting coupling, a rotatable driving hub having a pair of diametrically opposite notches each defined by a pair of spaced outwardly extending lugs, a pair of arcuate friction bands fitting around the hub in radial registry and each extending through substantially a semi-circle, and driving projections extending radially inward from the ends of the bands and fitting loosely in the driving notches, and resilient pads between the driving projections and the lugs.

9. In a torque transmitting coupling, a rotatable driving hub having a pair of diametrically opposite notches each defined by a pair of spaced outwardly extending lugs, a pair of arcuate friction bands fitted around the hub in radial registry and each extending through substantially a semi-circle, and driving projections extending radially inward from the ends of the bands and fitting loosely in the driving notches, the hub having a pair of axially spaced flanges thereon between which the friction bands slidably fit, and spring fingers extending axially from one of the flanges and connected to the bands to urge them inward of the hub.

10. In a torque transmitting coupling, a rotatable driving hub having a pair of diametrically opposite notches each defined by a pair of spaced outwardly extending lugs, a pair of arcuate friction bands fitting around the hub in radial registry and each extending through substantially a semi-circle, and driving projections extending radially inward from the ends of the bands and fitting loosely in the driving notches, the hub having a pair of axially spaced flanges thereon between which the friction bands slidably fit, spring fingers extending axially from one of the flanges to points radially inward from the central parts of the bands, pins extending radially inward from the central parts of the bands and connected to the spring fingers, and curved weight members carried by the pins and engaging the inner surfaces of the bands.

11. In a torque transmitting coupling, a rotatable driving hub having a plurality of circumferentially spaced peripheral notches, each defined by substantially radially extending spaced lugs, a plurality of arcuate friction bands lying in radial registry around the hub corresponding in number to the notches and extending between the notches, the end portions of each band overlying lugs for two different notches inwardly extending driving projections on the ends of the bands extending into the notches respectively and spaced from the sides of the notches to drive the bands with the hub and to limit radial outward movement of the bands on the hub, and non-metallic pads between the driving projections and the sides of the notches to cushion engagement therebetween.

12. In a torque transmitting coupling, a rotatable driving hub having a plurality of circumferentially spaced peripheral notches, a plurality of arcuate friction bands lying in radial registry around the hub corresponding in number to the notches and extending between the notches, inwardly extending driving projections on the ends of the bands extending into the notches and spaced from the sides of the notches to drive the bands with the hub and to limit radial outward movement of the bands on the hub, and non-metallic pads between the driving projections and the sides of the notches to cushion engagement therebetween, said pads being formed by outer wear plates of relatively hard plastic material to engage the driving connections and the sides of the notches and elastic means lying between and connecting the wear plates.

13. In a torque transmitting coupling, a rotatable driving hub having a plurality of circumferentially spaced peripheral notches, a plurality of arcuate friction bands lying in radial registry around the hub corresponding in number to the notches and extending between the notches, inwardly extending driving projections on the ends of the bands extending into the notches and spaced from the sides of the notches to drive the bands with the hub and to limit radial outward movement of the bands on the hub, and non-metallic pads between the driving projections and the sides of the notches to cushion engagement therebetween, said pads being formed by outer wear plates of relatively hard plastic material to engage the driving connections and the sides of the notches and a body of elastic material lying between and secured to the inner surfaces of the wear plates.

14. In a torque transmitting coupling, a rotatable driving hub having a plurality of circumferentially spaced peripheral notches each defined by substantially radially extending spaced lugs, means defining driving surfaces on the inner sides of the lugs, a plurality of arcuate friction bands lying in radial registry around the hub corresponding in number to the notches and extending between the notches, the end portions of each band overlying lugs for two different notches, and inwardly extending driving projections on the ends of the bands extending into the notches respectively and having clearance with the sides thereof to drive the bands with the hub, the projections and driving surfaces of the notches lying generally transverse to the direction of movement of the bands so that the projections will engage the driving surfaces as the bands move outward to limit radial outward movement of the bands on the hub.

References Cited in the file of this patent
UNITED STATES PATENTS

| | | |
|---|---|---|
| 994,379 | Faile | June 6, 1911 |
| 2,032,066 | Nieman et al. | Feb. 25, 1936 |
| 2,375,909 | Fawick | May 15, 1945 |

FOREIGN PATENTS

| | | |
|---|---|---|
| 121,981 | Great Britain | Jan. 3, 1919 |
| 199,796 | Great Britain | June 28, 1923 |
| 490,605 | Great Britain | Aug. 17, 1938 |